(12) United States Patent
Jackson

(10) Patent No.: US 9,789,890 B1
(45) Date of Patent: Oct. 17, 2017

(54) ADJUSTABLE BRAKE BEAM

(71) Applicant: John M. Jackson, Texarkana, AR (US)

(72) Inventor: John M. Jackson, Texarkana, AR (US)

( * ) Notice: Subject to any disclaimer, the term of this patent is extended or adjusted under 35 U.S.C. 154(b) by 0 days.

(21) Appl. No.: 15/221,427

(22) Filed: Jul. 27, 2016

(51) Int. Cl.
| | | |
|---|---|---|
| *B61H 13/36* | (2006.01) | |
| *B61H 15/00* | (2006.01) | |
| *B61H 13/26* | (2006.01) | |
| *B61H 13/24* | (2006.01) | |
| *B60T 1/04* | (2006.01) | |
| *B60T 8/18* | (2006.01) | |
| *B60T 11/04* | (2006.01) | |

(52) U.S. Cl.
CPC ......... *B61H 15/0078* (2013.01); *B61H 13/36* (2013.01); *B60T 1/04* (2013.01); *B60T 8/1893* (2013.01); *B60T 11/04* (2013.01); *B61H 13/24* (2013.01); *B61H 13/26* (2013.01)

(58) Field of Classification Search
CPC .......... B60T 1/04; B60T 11/04; B60T 8/1893; B61H 13/24; B61H 13/26; B61H 13/36; B61H 15/0078
USPC .............................................. 188/34, 49, 52
See application file for complete search history.

(56) References Cited

U.S. PATENT DOCUMENTS

| | | | | |
|---|---|---|---|---|
| 4,771,868 A * | 9/1988 | Haydu | ............. | B61H 13/02 188/52 |
| 4,775,035 A * | 10/1988 | Brodeur | ............. | B60T 8/1893 188/195 |
| 4,830,148 A * | 5/1989 | Hart | ............. | B61H 13/36 188/219.1 |
| 4,905,795 A * | 3/1990 | Rains | ............. | B61D 3/14 188/107 |
| 5,000,298 A * | 3/1991 | Jackson | ............. | B61H 13/36 188/219.1 |
| 5,069,312 A * | 12/1991 | Kanjo | ............. | B61H 13/24 188/33 |
| 5,361,876 A * | 11/1994 | Haverick | ............. | B61H 13/24 188/219.1 |
| 5,456,337 A * | 10/1995 | Jackson | ............. | B61H 13/38 188/212 |
| 6,148,966 A * | 11/2000 | Daugherty, Jr. | ............. | B61H 15/00 188/198 |
| 6,241,057 B1 * | 6/2001 | Hiatt | ............. | B60T 1/04 188/153 R |
| 6,305,504 B1 * | 10/2001 | Ring | ............. | B61H 13/36 188/219.1 |
| 6,702,073 B2 * | 3/2004 | Sommerfeld | ............. | B60T 1/04 188/219.1 |
| 7,896,140 B2 * | 3/2011 | Heitmeyer | ............. | B60T 11/04 188/52 |

* cited by examiner

*Primary Examiner* — Thomas Irvin
(74) *Attorney, Agent, or Firm* — Richard G. Eldredge; Eldredge Law Firm

(57) ABSTRACT

An adjustable brake system for a railroad truck wheel frame. The system includes an elongated body secured to a railroad truck and rotatably secured to a plurality of wheels, the elongated body having a brake side pocket positioned near a wheel of the plurality of wheels; a compression bar and an extension bar extending from a first side of the elongated body to a second side of the elongated body; a strut positioned between the compression bar and the extension bar; a brake head rigidly secured to the compression bar; a protrusion extending from the brake head and configured to engage within the brake side pocket; and a cam rotatably attached to the compression bar and configured to engage within the brake side pocket.

7 Claims, 11 Drawing Sheets

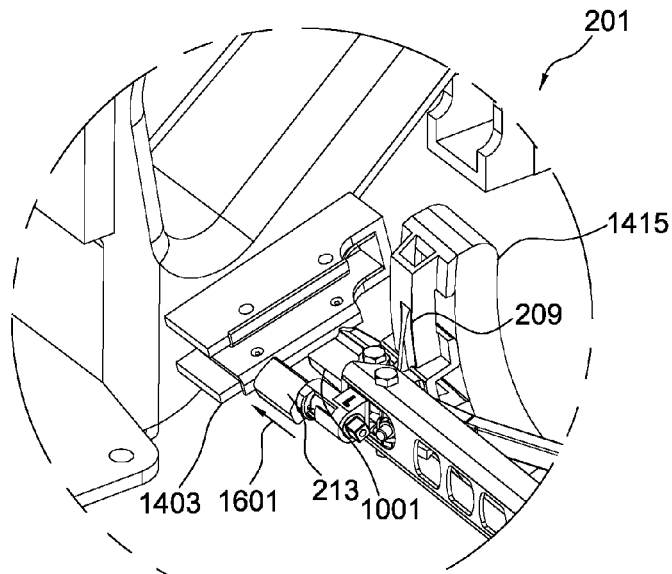
FIG. 16A
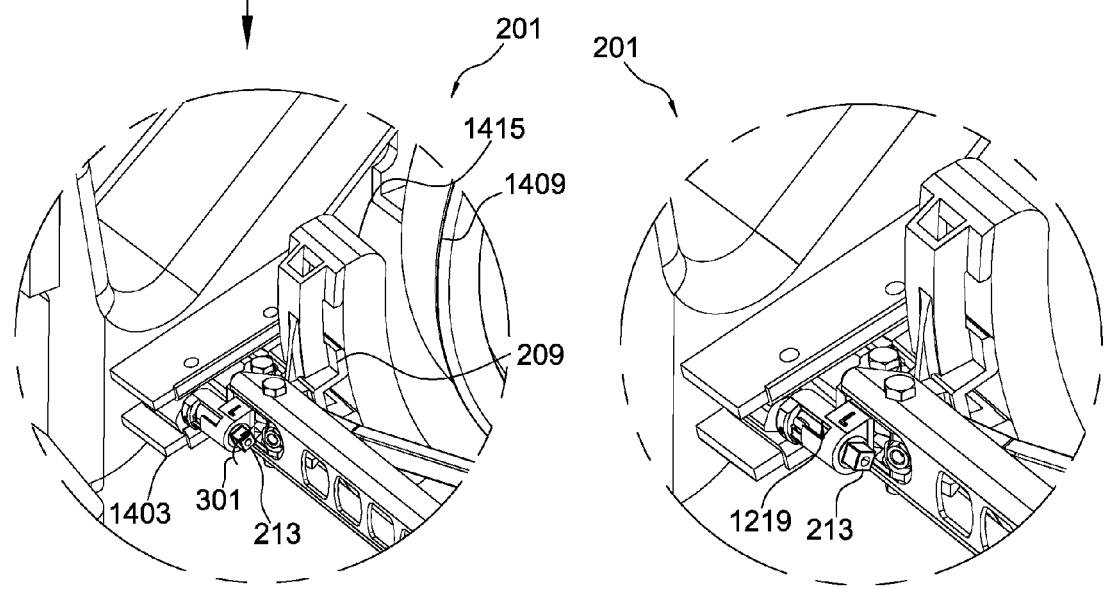
FIG. 16B
FIG. 16C

ADJUSTABLE BRAKE BEAM

BACKGROUND

1. Field of the Invention

The present invention relates generally to railroad car truck brake systems, and more specifically, an adjustable brake beam.

2. Description of Related Art

Railroad car truck brake beams are well known in the art and provide a viable means of stopping a train. In FIG. 1, a conventional brake beam system 101 is shown. System 101 depicts a rectilinear compression member 103, a rectilinear tension member 129, strut 117 with means for connecting said tension member 129 and said compression member 103, brake heads 131 and 133 with recesses so that said tension member 129 and said compression member 103 may be partially located therein.

As depicted in FIG. 1, a brake beam system 101 is supported on guides 127 and 109 located adjacent to the wheels 105 and 123. A lever (not shown) inserted within the slot 121 applies force in the direction of arrows 113 and 115. When force is applied in the direction of arrow 113, the beam 103 moves in the direction arrow 113 so that brake shoes 125 and 107 contact wheels 123 and 105, respectively.

As is known to those skilled in the art, because of the substantial speeds at which railroad cars travel and the heavy loads they carry, large braking forces are required to be transferred to the wheels through the brake beam assemblies during their operation. These forces, and random vibrations borne through the truck structure to the brake beams, create stresses in numerous areas.

The rails 109 and 127 contain recessed, parallel side pockets with an internal liner (not shown in FIG. 1 but discussed in more detail herein) which allow the beam 103 to move by sliding in directions 113 and 115. The brake heads 131 and 133 contain protrusions 135 and 137, respectively, which are commonly known as end extensions. The end extensions 135 and 137 are tapered by design and are sized to fit into the side pockets of the rails 109 and 127. It is notable that the end extensions 135 and 137 are non-adjustably integral to the brake heads 131 and 133, respectively, since the brake heads (with end extensions) are manufactured as a "one piece" casting. As depicted in FIG. 1, each brake beam system 101 contains a right hand and left hand brake head.

When the brake beam 103 is engaged such that the brake shoes 125 and 107 contact the wheels 123 and 105, the resultant friction force is transmitted through the brake beam system 101 through end extensions 135 and 137 to the fixed rails 127 and 109. Due to tolerance stack-up and loose regulatory standards, the end extensions 135 and 137 loosely fit in the side pockets of the rails 127 and 109 causing them to become diagonally constrained when the brake beam is engaged. Simply put, the end extensions 135 and 137 contact the side pockets via two-point contact; one point on the upper trailing edge of the side pocket and another point on the lower leading edge of the side pocket.

The inherent sloppy fit of the tapered end extensions 135 and 137 to the side pockets of the rails 127 and 109 allows the brake beam to move until the end extensions become diagonally constrained. This allowable, inherent movement causes misalignment between brake shoes 107 and 125 and wheels 105 and 123 resulting in uneven brake shoe wear. This uneven shoe wear; commonly referred to as shoe taper, can occur on new railcars during the first deployment of use. This is viewed as a disadvantage of conventional brake beam systems.

Although great strides have been made in the area of brake beam system, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 16A, 16B, and 16C are oblique views of the installation of the adjustable brake beam system of FIG. 2;

Figure 1:
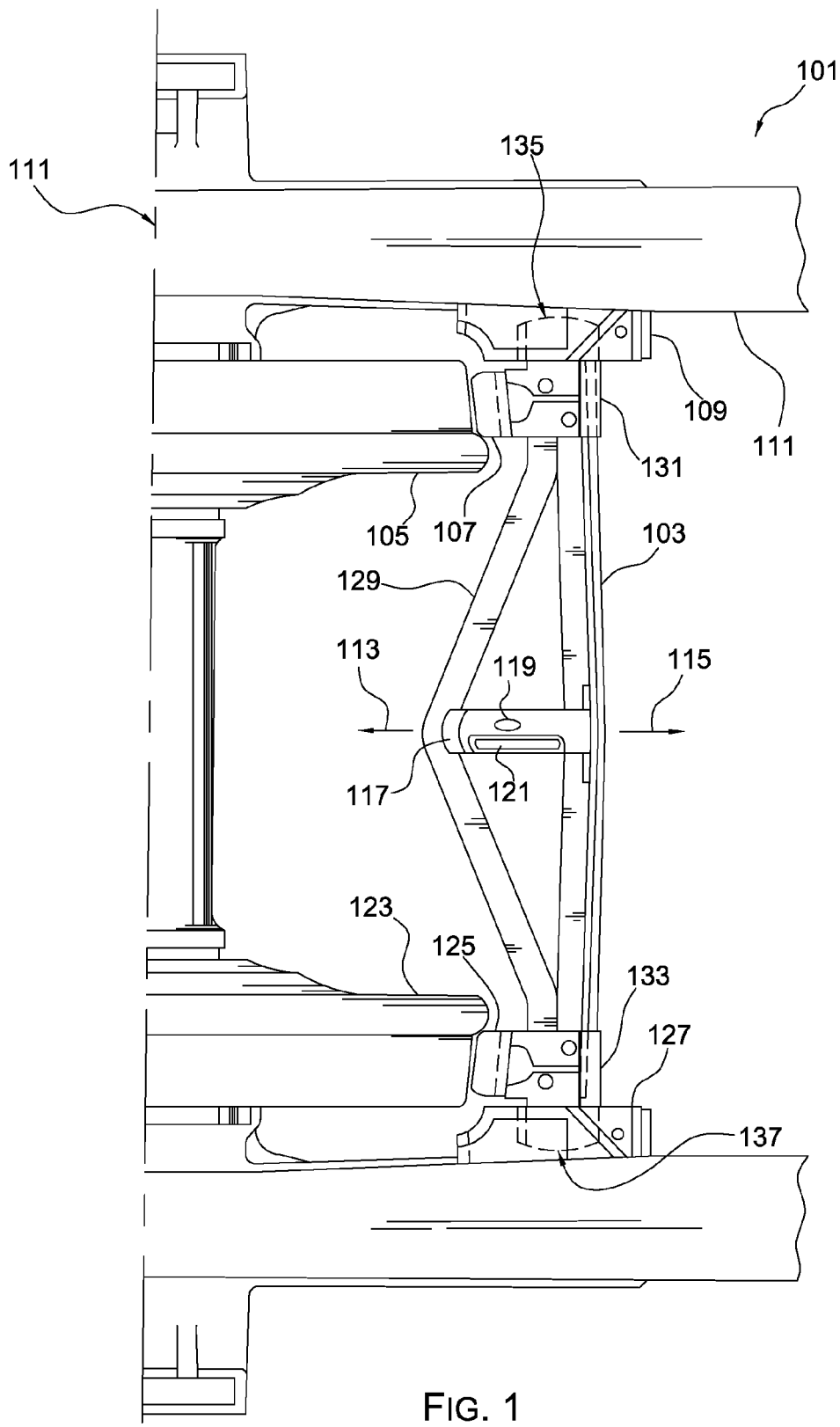
FIG. 1 is a top view of a conventional brake beam system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional brake beam systems. Specifically, the system of the present application provides a new and useful adjustable brake beam which will allow the user to eliminate pre-mature brake shoe taper through the use of a unique, adjustable fit up method. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
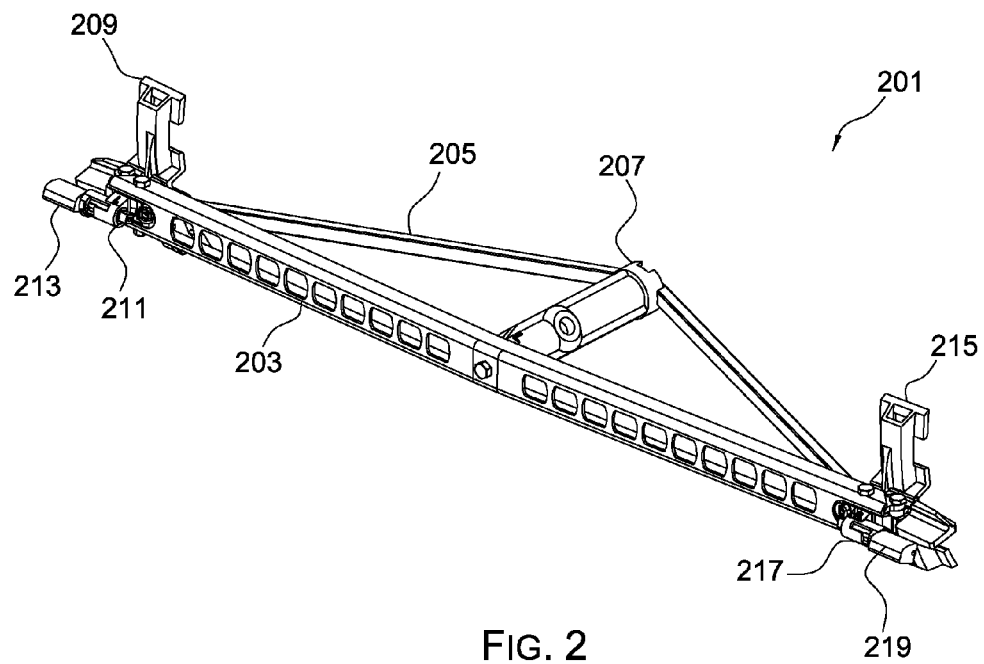
FIG. 2 is an oblique view of an adjustable brake beam system in accordance with a preferred embodiment of the present application.

Referring now to the drawings wherein like reference characters identify corresponding or similar elements throughout the several views, FIG. 2 depicts an adjustable brake beam system in accordance with a preferred embodiment of the present application. It will be appreciated that the adjustable brake beam system 201 overcomes one or more of the above-listed problems commonly associated with conventional brake beam systems.

In a preferred embodiment, system 201 includes a compression member 203, tension member 205, strut 207, brake heads 209 & 215, and adjustable adapters 211 & 217 with cams 213 & 219. Each of the said components contain unique features in regards to functionality of system 201 which will be discussed further herein.

Figure 3:
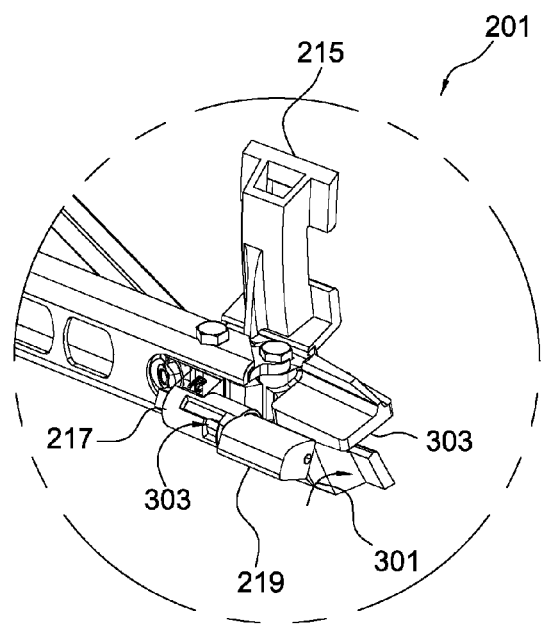
FIGS. 3, 4, & 5 are oblique views of the adjustable brake beam system of FIG. 2.

Referring to FIG. 3, an oblique view of system 201 is given which depicts adjustablility features of the exemplary embodiment. In this embodiment, the end extension of the brake head is made up of two pieces; a non-adjustable protrusion 303 which is integral to the brake head 215 and an adjustable cam 219 which is pivotably adjustable in arrow direction 301. The adjustable adapter 217 provides a bore for the cam 219 to rotate inside of as well a mechanical means of retaining the cam 219. As depicted in FIG. 3, the cam includes a key 305 which rotates in a radial slot on the adjustable adapter 217 which, in turn, provides a finite angle rotation for the cam 219. It is appreciated that though FIG. 3 only depicts the right hand side of the brake beam 201, the aforementioned features are duplicated in a mirror fashion on the left hand side of system 201 in brake head 209, adjustable cam 213, and adjustable adapter 211.

Figure 4:
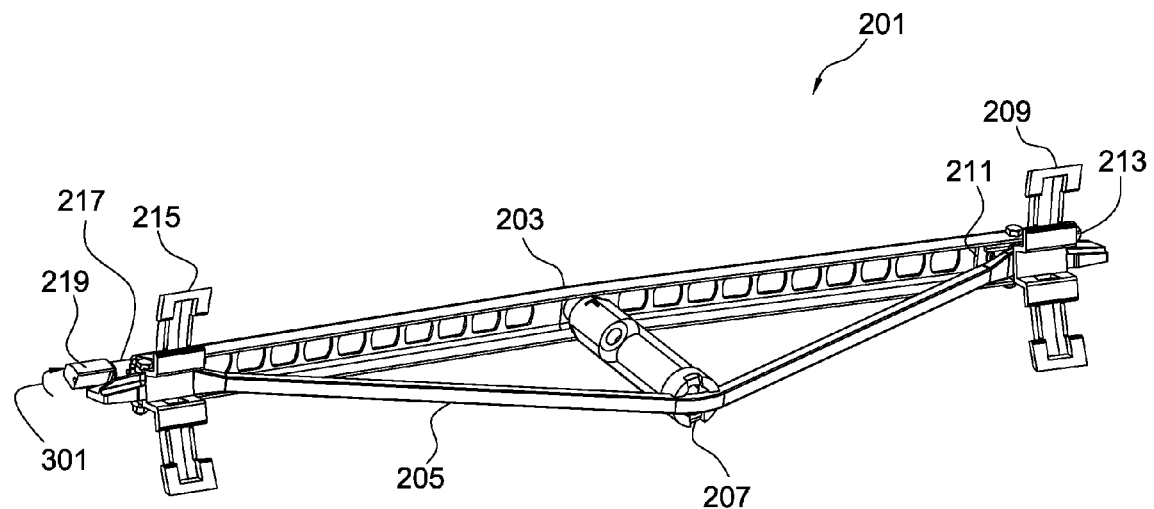

Referring now to FIG. 4, another oblique view of system 201 is given. The brake head 215 & 209, strut 207, tension member 205, and compression member 203 is more clearly indicated in FIG. 4.

Figure 5:
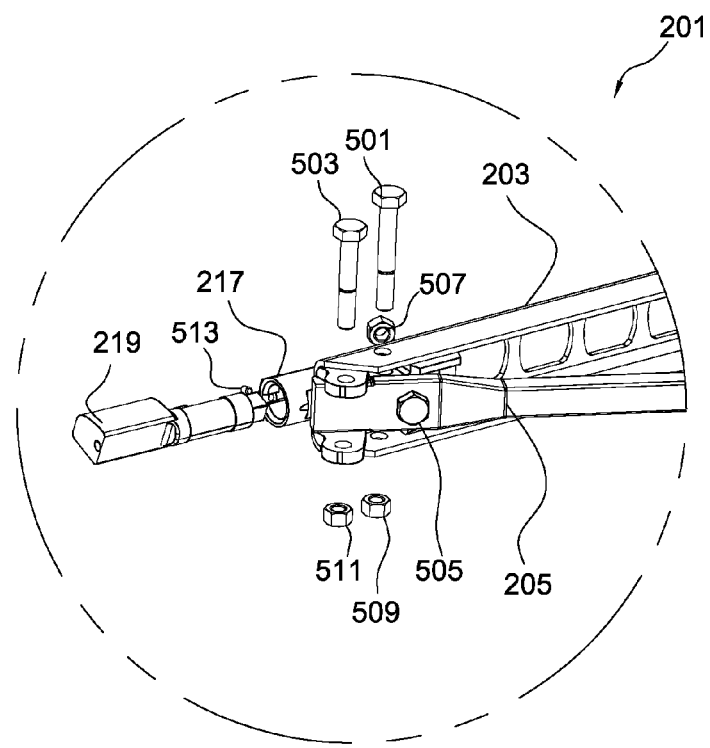

Referring now to FIG. 5, an exploded, oblique view of system 201 is given which the brake head 215 not shown for clarity. FIG. 5 depicts the method of fastening the components of system 201. The tension member 205 is mechanically fastened to the adjustable adapter 217 and compression member 203 through fasteners 505 and 507. The brake head 215 (not shown) is attached to the brake beam system 201 using one or more fasteners 501, 503, 509, and 511. The adjustable cam 219 is inserted into the adjustable adapter 217 and retained using one or more fasteners 513.

Figure 6:
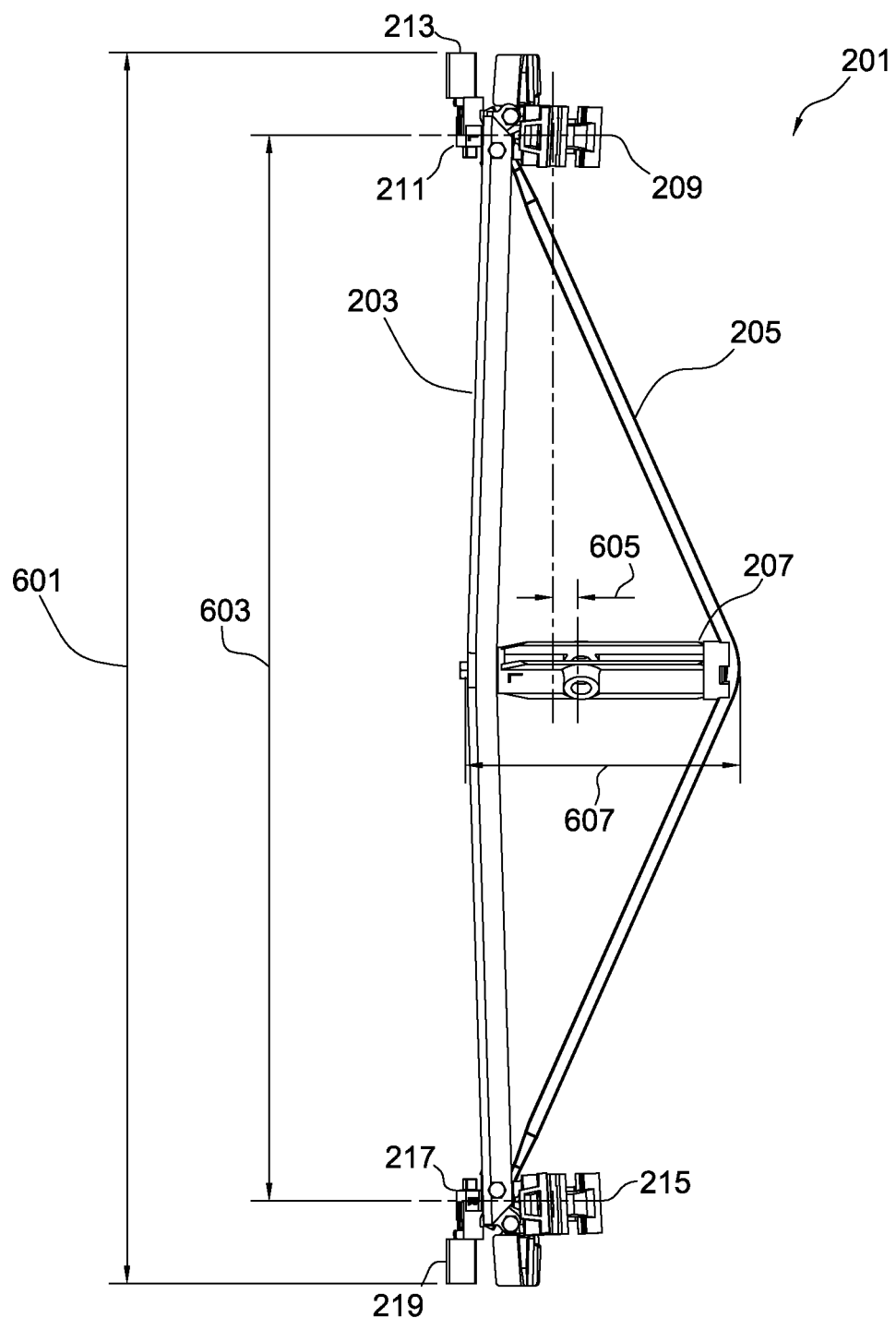
FIG. 6 is a top view of the adjustable brake beam system of FIG. 2.

Referring now to FIG. 6, a top view of system 201 is shown. The practical use of the adjustable brake beam system 201 in the field requires compliance to the governing authority's standards. Therefore, dimensions 601, 603, 605, and 607 are in accordance with the Association of American Railroads' "Manual of Standards and Recommended Practices", Section D, Trucks and Truck Details, Standard S-345-79, "Application Tolerances for Brake Beams, Hangerless Types".

Figure 7:
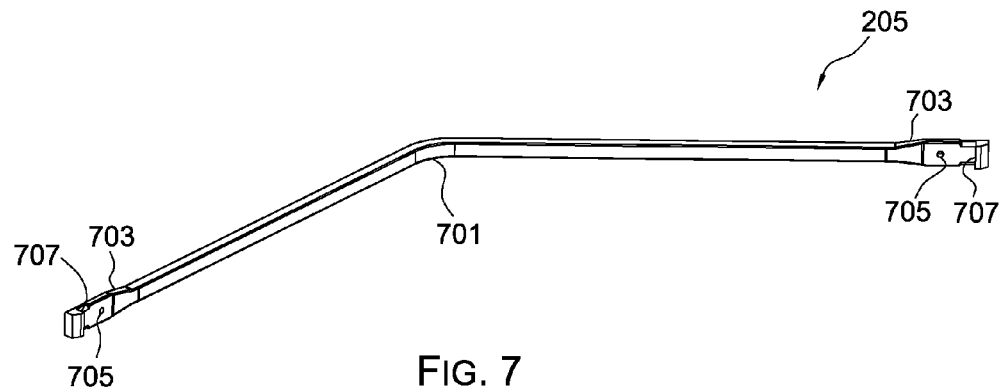
FIG. 7 is an oblique view of the tension member of the adjustable brake beam system of FIG. 2.

Referring now to FIG. 7, an oblique view of the tension member 205 of system 201 is given. Because of its unique geometry and construction, it is especially suited for use in the adjustable brake beam system 201. As depicted, the tension member 205 is formed from a substantially "rectangular" cross-sectional shape. The center of the tension member contains a bend 701 which forms to a uniquely contoured slot in the strut 207. The tension member 205 also contains one or more transitions 703 in which the cross-section becomes flatter and wider. The holes 705 provide a measure of mounting for fasteners 505 and 507. One or more formed, angled vertical surfaces 707 are included which aid in transmitting the loads into the adjustable adapters 217 and 211.

Figure 8:
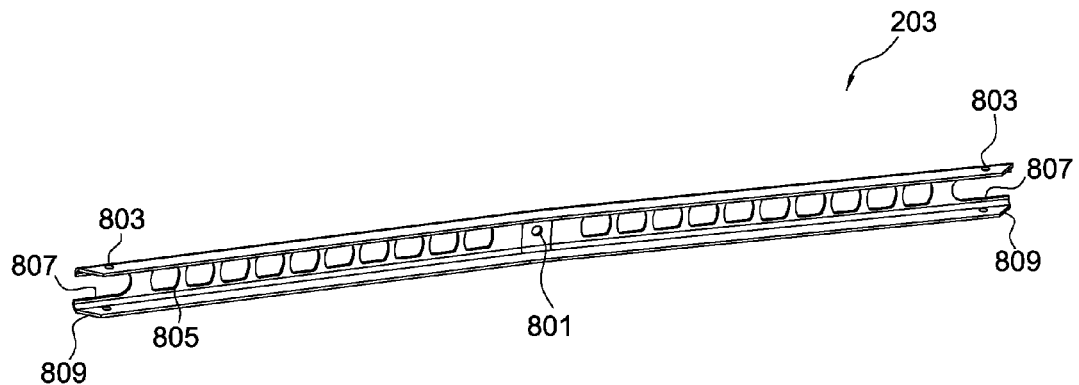
FIG. 8 is an oblique view of the compression member of the adjustable brake beam system of FIG. 2.

Referring now to FIG. 8, an oblique view of the compression member 203 of system 201 is given. Because of its unique geometry and construction, it is especially suited for use in the adjustable brake beam system 201. The compression member 203 is "U" shaped in cross-section and contains several unique features. A center hole 801 is a provision for the mounting of the strut 207. One or more lightening holes 805 are included to decrease the overall weight of the compression member 203. Additionally, the compression member 203 includes one or more mounting holes 803 which are a provision for mounting fasteners 501 and 509. One or more cutouts 807 provide clearance for the adjustable adapters 217 and 211 and to protrude through the backside of the compression member 203. Finally, one or more chamfers 809 are included which provide clearance for fasteners 503 and 511 as well as a weld seam for permanent fastening of the adjustable adapters 217 and 211 to the compression member 203.

Figure 9:
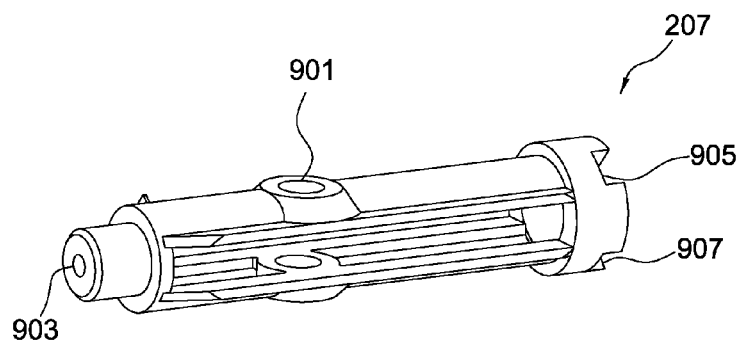
FIG. 9 is an oblique view of the strut of the adjustable brake beam system of FIG. 2.

Referring now to FIG. 9, an oblique view of the strut 207 of system 201 is given. The strut 207 is generally cylindrical in shape and provides a means for the pin (not shown) to transmit the braking force through the adjustable brake beam system 201. The strut 207 contains a pin hole 901 whose centerline is normal to the centerline of the strut 207. One end of the strut 207 contains a protrusion with one or more mounting holes 903. Another end of the strut 207 contains uniquely contoured slots 905 and 907 which are sized and oriented to match and fit the bend contour 701 of the tension member 205.

Figure 10:
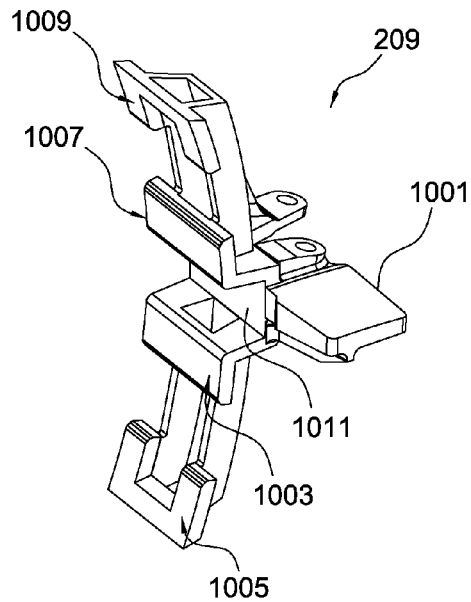
FIGS. 10 & 11 are oblique views of the brake head of the adjustable brake beam system of FIG. 2.
Figure 11:
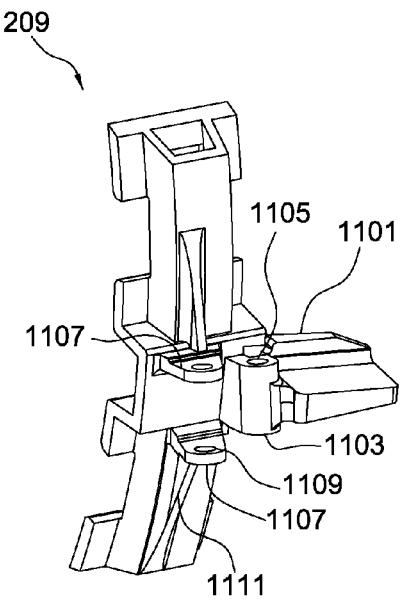

Referring now to FIGS. 10 & 11, oblique views of the brake head 209 of system 201 are shown. It is appreciated that brake head 215 of system 201 contains identically mirrored features to that of brake head 209 depicted in FIGS. 10 & 11. The brake head 209 contains one or more brake shoe (not shown) mounting surfaces 1003, 1005, 1007, and 1009 which form an arc. The radius of the arc, as well as all of the other critical dimensions of the brake heads 209 and 215 are in accordance with pages Standard S-371-81, "LIMITING CONTOUR OF BRAKE HEADS FOR HANGERLESS TYPE BRAKE BEAMS". The brake head 209 also contains a non-adjustable protrusion 1001 which is commonly referred to as end extension. The end extension 1001 is stiffened by gusset 1101 which is given in FIG. 11. A protruding male and female clevis 1103 and 1107, respectively, provide a mounting provision of the brake head 209 to the adjustable brake beam system 201 using holes 1105 and 1109, respectively. One or more stiffening gussets 1111 are included on brake head 209 to aid in transmitting the braking forces through the brake head 209 into the brake beam system 201.

Figure 12:
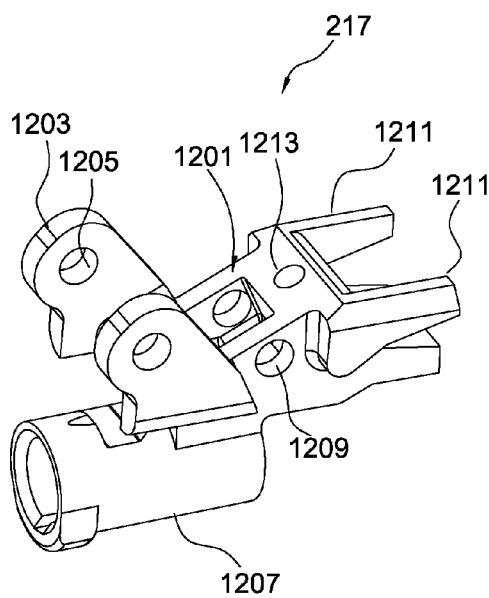
FIGS. 12 & 13 are oblique views of the adjustable adapter of the adjustable brake beam system of FIG. 2.
Figure 13:
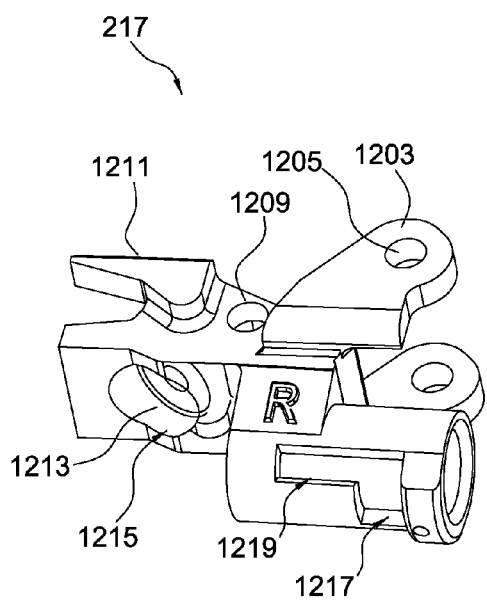

Referring now to FIGS. 12 & 13, oblique views of the adjustable adapter 217 of system 201 are shown. It is appreciated that adjustable adapter 211 of system 201 contains identically mirrored features to that of adjustable adapter 217 depicted in FIGS. 12 & 13. The adjustable adapter 217 is uniquely shaped to provide multiple functions in its use on system 201. The adjustable adapter 217 provides a means of mechanically attaching the compression member 203 to the tension member 205. The tension member hole 705 aligns with hole 1213 while the angled flat surface 1201 provides a mating surface for the tension member 205 end. Holes 1205 and 1209 provide a mounting means for fasteners 501, 503, 509, and 511. The female clevis 1203 fits precisely on the male clevis 1105 of the brake head 209. Finally, the hole 1213 and counter-bore surface 1215 provide clearance for mounting fasteners 505 and 507, respectively.

Additionally, the adjustable adapter 217 provides a housing and retention for the adjustable cam 219 which is depicted by cylinder 1207. The radial slot 1217 provides a means of finite rotary adjustability of the cam 219 while weld slot 1219 provides a means of permanent welding after mechanical fit up during installation. One or more weld arm 1211 are also included which provide another means of welding the adjustable adapter to the compression member 203.

Figure 14:
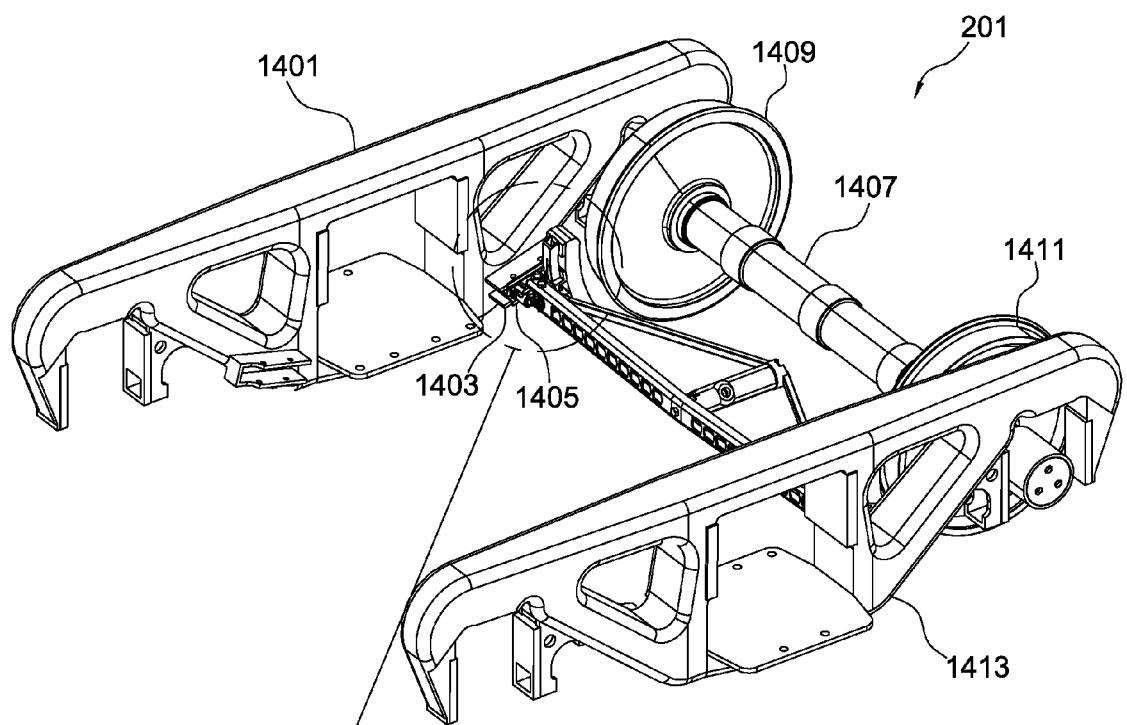
FIGS. 14 & 15 are oblique views of the installation of the adjustable brake beam system of FIG. 2.
Figure 15:
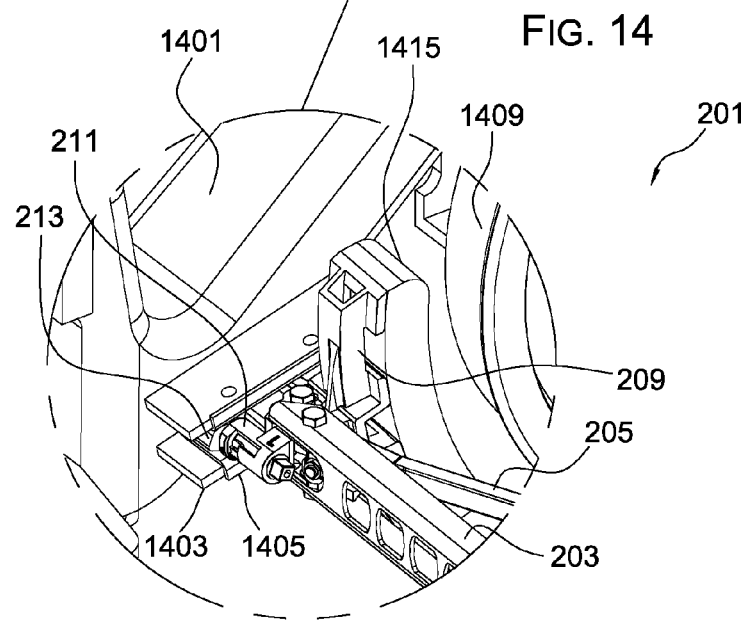

Referring now to FIGS. 14 & 15, oblique views of the system 201 are shown depicting its installation on an existing railroad car truck. Railroad side frame 1401 and 1413 contain side pockets 1403 with replaceable liner 1405. The adjustable cam 213 and brake head 209 end extension 1001 fits into the recessed side pocket 1403 and liner 1405. The brake shoe 1415 is installed on the arched surfaces of the brake head 209 and is arched to match the outer contour of the wheel 1409 secured to a shaft 1407 rotatably attached to the body of the frame 1401.

Referring now to FIGS. 16A, 16B & 16C, oblique views of the system 201 are shown depicting its installation on an existing railroad car truck. In FIG. 16A, the adjustable brake beam system 201 is inserted in the side pocket in arrow direction 1601 with the adjustable cam 213 oriented as depicted. In FIG. 16B, brake head 209 and brake shoe 1415 are aligned to the wheel 1409 before the adjustable cam is rotated in arrow direction 301 so that the adjustable brake beam system 201 is diagonally constrained. As previously mentioned, two-point contact takes place in the side pockets 1403 in order constrain the brake beam system 201 and resist the braking forces. System 201 allows the user to match the brake head 209 to the wheel 1409 while diagonally constraining its two-piece end extension; namely, the adjustable cam 213 and brake head end extension 1001 in the side pocket 1403. This will allow the user to greatly reduce and/or eliminate shoe taper and premature shoe wear. This is viewed as an advantage of the system of the present application.

As depicted in FIG. 16C, once the adjustable cam 213 is rotated until the upper trailing edge makes contact with the side pocket 1403, a permanent weld is made in slot 1219 which locks the orientation of cam 213 relative to the adjustable adapter 211.

Figure 17:
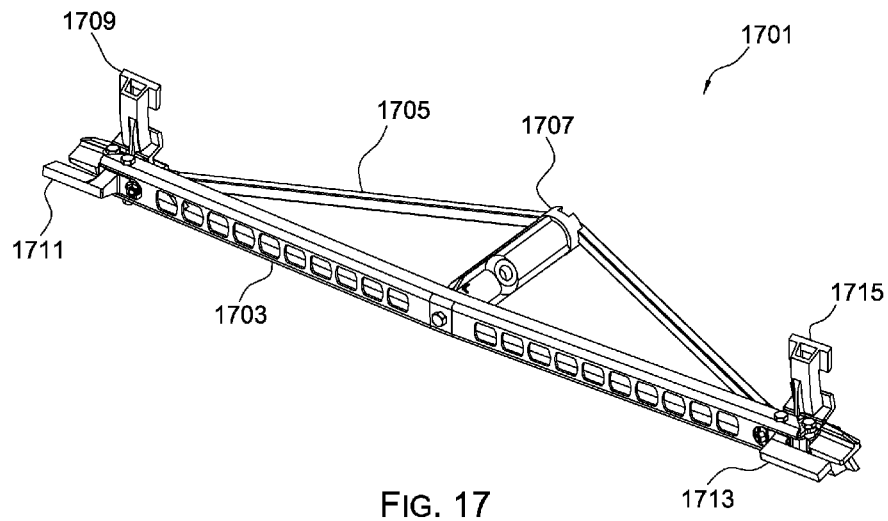
FIG. 17 is an oblique view of a non-adjustable brake beam system in accordance with an alternate embodiment of the present application.

Referring now to FIG. 17, an exploded view of system 1701 is respectively shown in accordance with alternative embodiment of the present application. System 1701 is substantially similar in function to system 201 and it is contemplated interchanging the features of the different types of the systems discussed herein.

In an alternative embodiment, system 1701 includes a compression member 1703, tension member 1705, strut 1707, brake heads 1709 & 1715, and non-adjustable adapters 1711 & 1713. In this embodiment, the non-adjustable adapters 1711 and 1713 end extension is pre-sized to fit the railroad car truck side pocket prior to installation.

Figure 18:
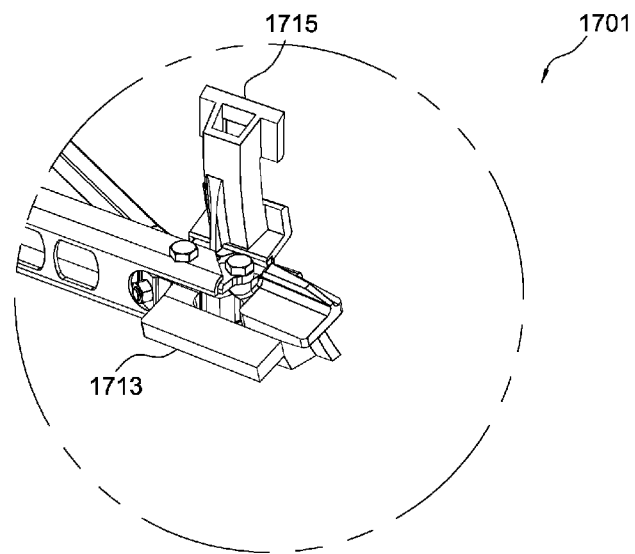
FIGS. 18 & 19 are oblique views of the non-adjustable brake beam system of FIG. 17.

In FIG. 18, an oblique view of system 1701 is given which shows how the end extension of the non-adjustable adapter 1713 appears.

Figure 19:
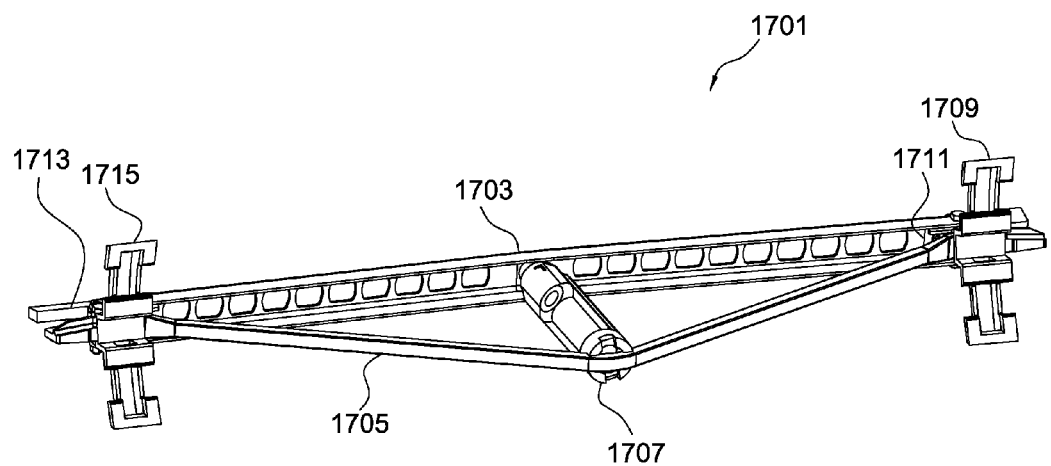

Referring now to FIG. 19, another oblique view of system 1701 is given. The brake head 1715 & 1709, strut 1707, tension member 1705, and compression member 1703 is more clearly indicated in FIG. 19.

Figure 20:
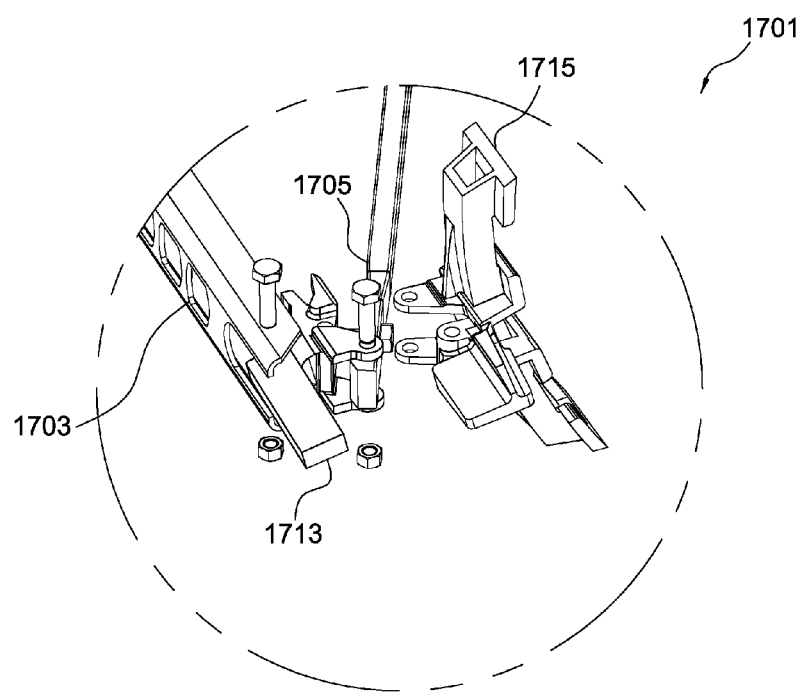
FIG. 20 is an oblique, exploded view of the non-adjustable brake beam system of FIG. 17.

Referring now to FIG. 20, an exploded, oblique view of system 1701 is given showing is method of assembly. System 1701's method of assembly is substantially similar to that of system 201.

Figure 21:
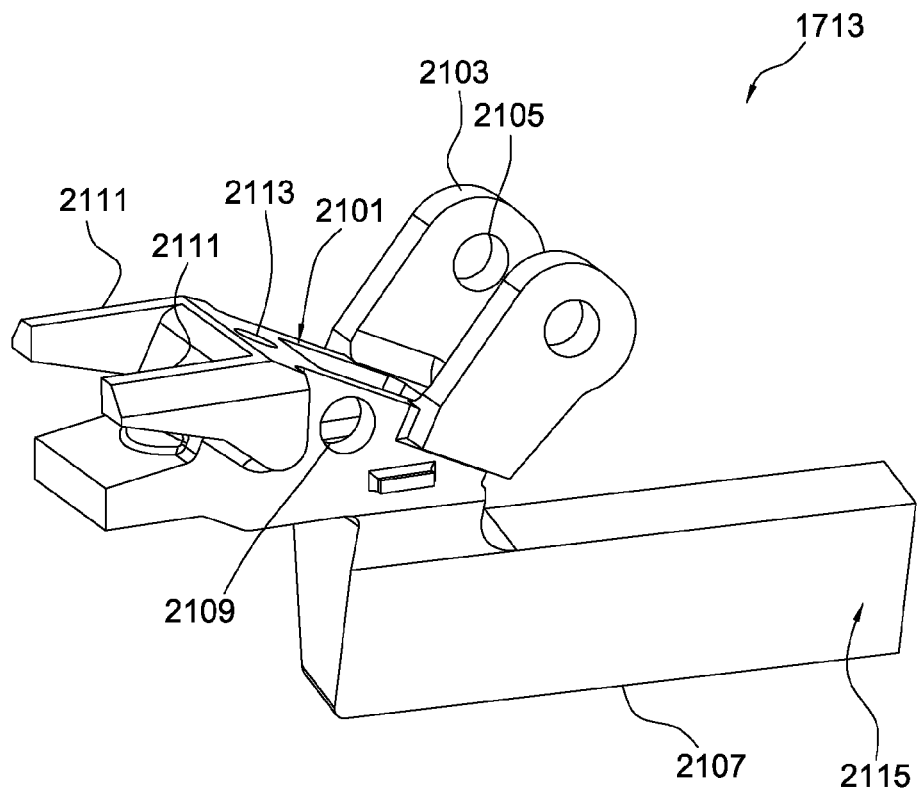
FIGS. 21 & 22 are oblique views of the non-adjustable adapter of the non-adjustable brake beam system of FIG. 17.
Figure 22:
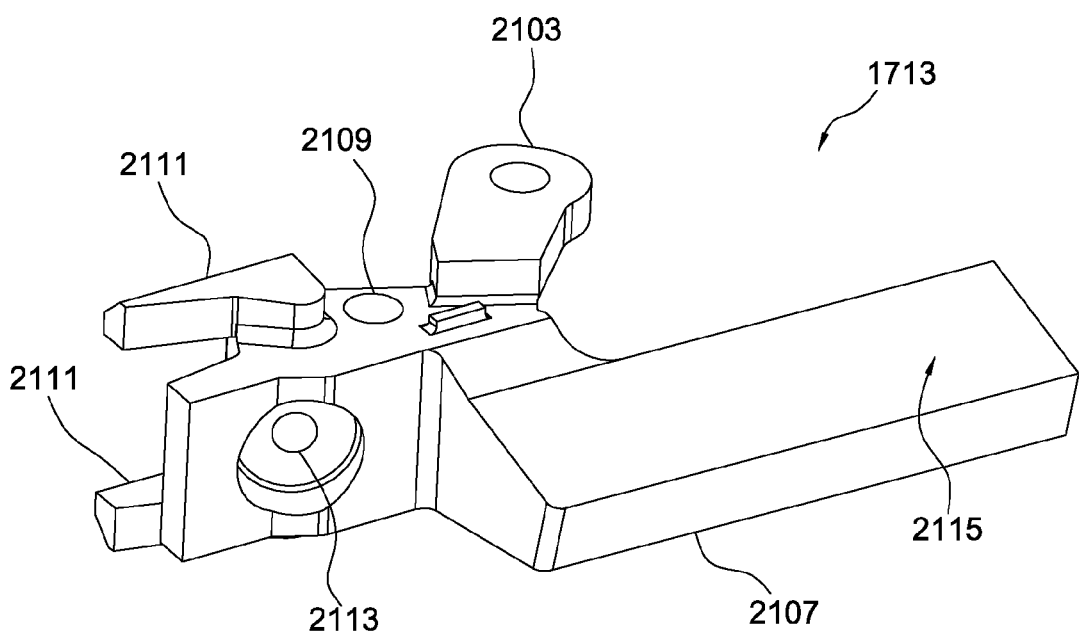

Referring now to FIGS. 21 & 22, oblique views of the non-adjustable adapter 1713 of system 1701 is given. It is appreciated that adjustable adapter 1713 of system 1701 contains identically mirrored features to that of non-adjustable adapter 1711 depicted in FIG. 17. The non-adjustable adapter 1713 is uniquely shaped to provide multiple functions in its use on system 1701. The non-adjustable adapter provides a means of mechanically attaching the compression member 1703 to the tension member 1705. The tension member hole aligns with hole 2113 while the angled flat surface 2101 provides a mating surface for the tension member 1705 end. Holes 2105 and 2109 provide a mounting means for mechanical fasteners. The female clevis 2103 fits precisely on the male clevis of the brake head 1709. Finally, the hole 2113 and counter-bore surface 2115 provide clearance for mechanical fasteners, respectively.

Additionally, the non-adjustable adapter 1713 provides a machinable surface 2115 on the end extension protrusion 2107. The machinable surface 1713 will be precisely contoured per the geometry of the truck side pockets based on the governing authority standards. This is viewed as an advantage of system 1701 of the present application.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An adjustable brake system for a railroad truck wheel frame, the system comprising:
    an elongated body secured to a railroad truck and rotatably secured to a plurality of wheels, the elongated body having a brake side pocket positioned near a wheel of the plurality of wheels;
    a compression bar and an extension bar extending from a first side of the elongated body to a second side of the elongated body;
    a strut positioned between the compression bar and the extension bar;
    a brake head rigidly secured to the compression bar;
    a non-adjustable protrusion extending from the brake head and configured to engage within the brake side pocket, the non-adjustable protrusion being rigidly attached to the compression bar, and the non-adjustable protrusion is configured to fit within the brake side pocket;
    an adjustable adapter rigidly secured to the compression bar, the adjustable adapter being positioned on a surface opposing the brake head, the adjustable adapted having an elongated key and a bore; and
    an adjustable cam secured within the bore of the adjustable adapter and configured to extend into the brake side pocket, the adjustable cam is configured to engage with the elongated key;
    wherein the non-adjustable protrusion and the cam both fit within the brake side pocket;
    wherein the cam is configured to rotate within the brake side pocket to a desired angle, which in turn causes a surface of the adjustable cam to engage with the brake side pocket; and
    wherein the adjustable cam and the non adjustable protrusion engage with interior surfaces of the brake side pocket to hold the brake head in a desired position.

2. The system of claim 1, the cam comprising:
    a body having a first surface extending relative perpendicular to a second surface and a third contoured surface that extends from the first surface to the second surface.

3. The system of claim 1, further comprising:
    a plurality of openings extending through a thickness of the compression bar.

4. The system of claim 1, further comprising:
    a plurality of replacement liners sandwiched between the cam and the brake side pocket.

5. A method to reduce shoe taper of a railroad truck brake pad, comprising:
    providing the system of claim 1;
    rotating the cam within the brake slide pocket to change the angle of the brake head relative to the wheel;
    welding the cam in a fixed position to prevent rotational movement;
    protecting the cam by positioning a replacement liner between the cam and the brake side pocket.

6. The method of claim 5, further comprising:
    restricting the rotational movement of the cam with an adapter rigidly secured to the compression bar.

7. The method of claim 5, further comprising:
    reducing the weight of the system by manufacturing a plurality of openings extending through a thickness of the compression bar.

* * * * *